United States Patent Office 3,446,193
Patented May 27, 1969

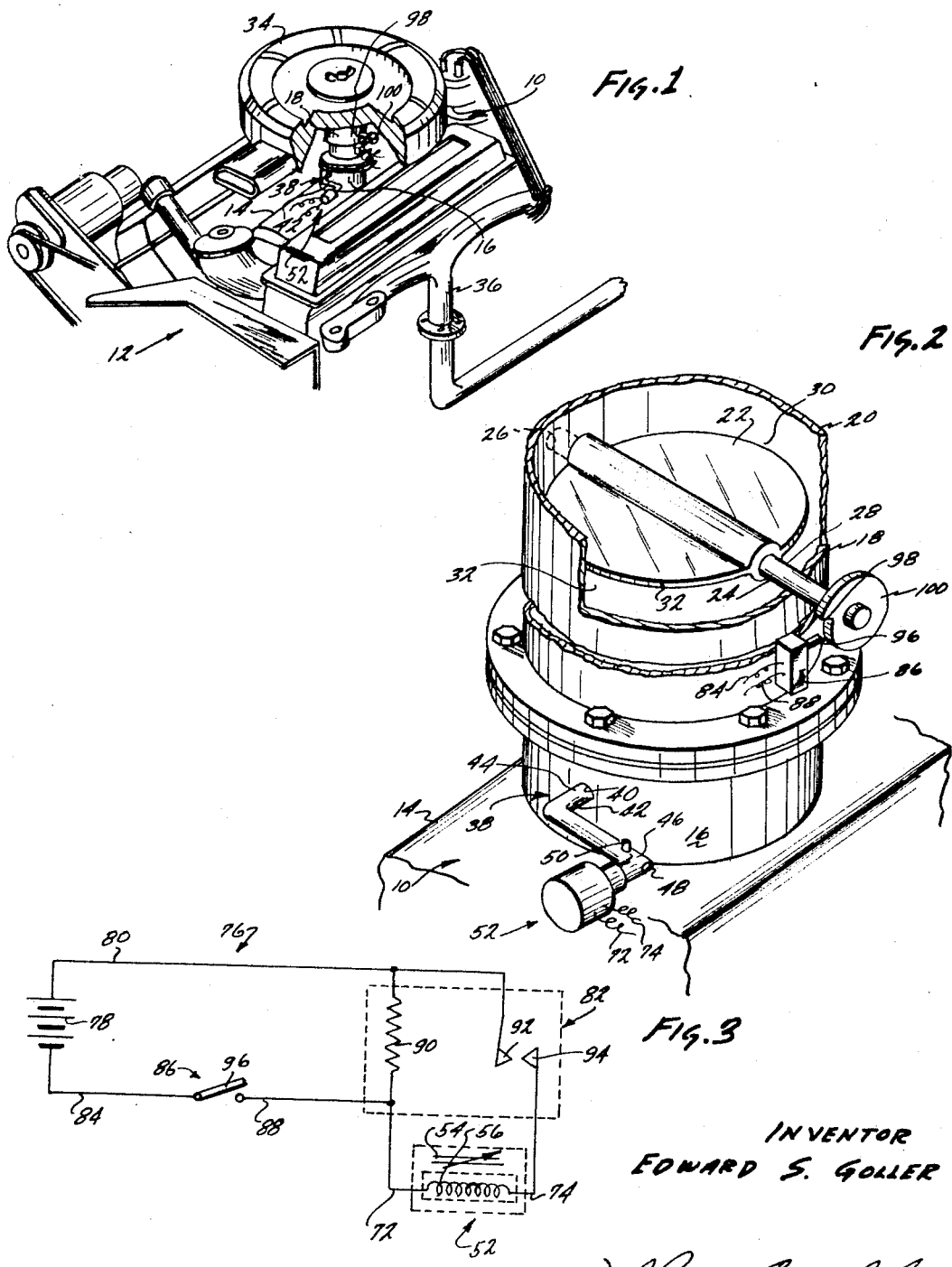

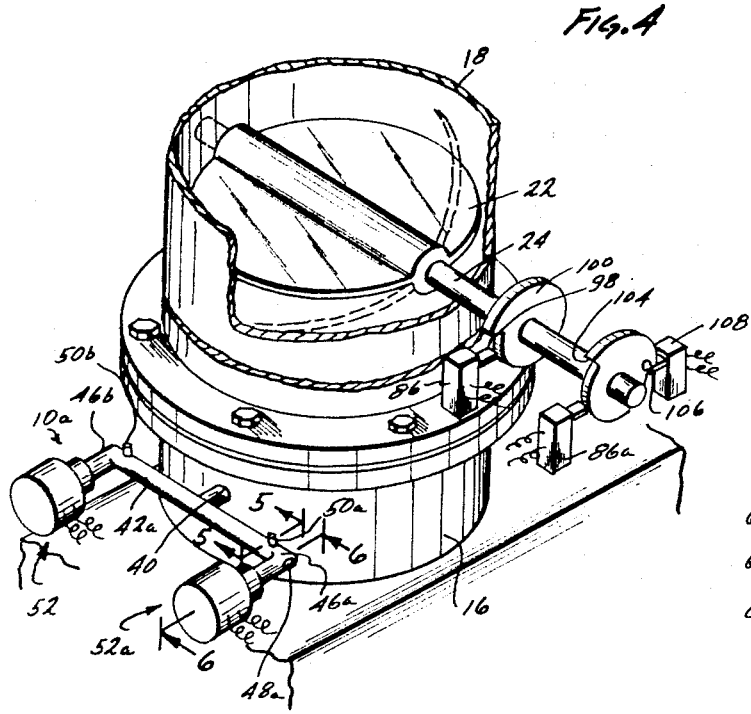
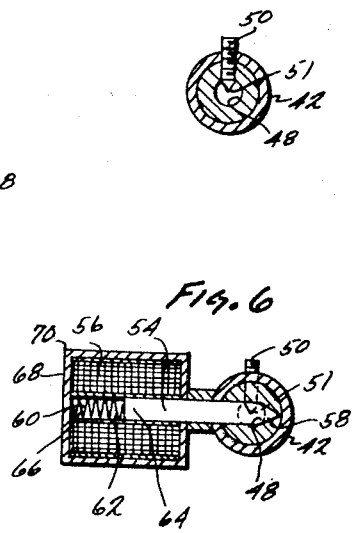
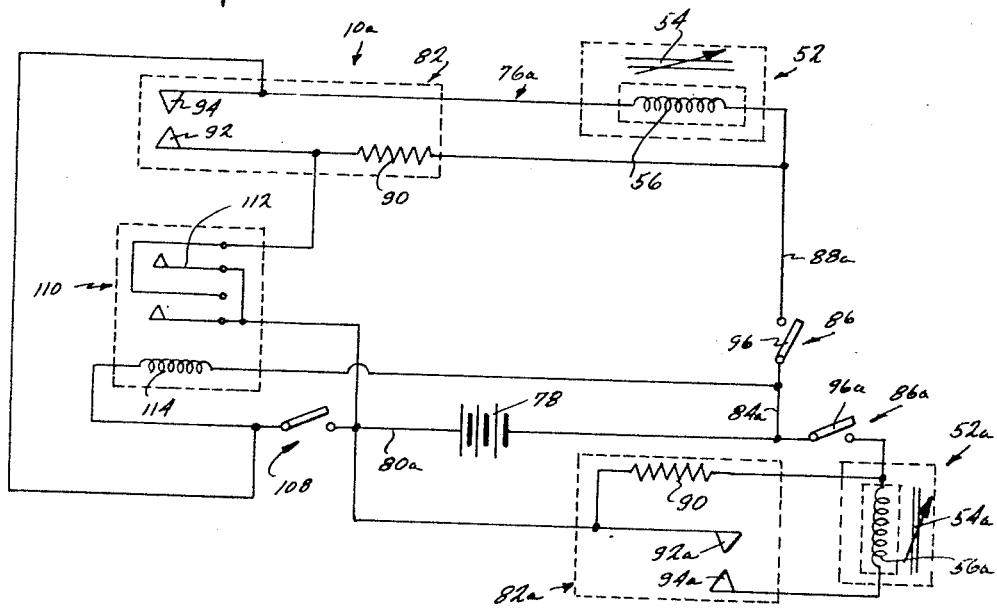

3,446,193
MEANS FOR IMPROVING COMBUSTION IN AN INTERNAL COMBUSTION ENGINE DURING DECELERATION
Edward S. Goller, 179 W. 50th St., San Bernardino, Calif. 92407
Filed June 21, 1967, Ser. No. 647,671
Int. Cl. F02m 3/06
U.S. Cl. 123—97                4 Claims

ABSTRACT OF THE DISCLOSURE

An air-flow control valve is connected to the intake manifold on an internal combustion engine immediately downstream of the carburetor butterfly valve and is actuated by a solenoid for a few seconds when the butterfly valve is closed for decelerating the engine. A time-delay relay is connected in a circuit with the solenoid and a switch. The switch is closed by a cam rotated by the butterfly-valve rod.

BACKGROUND OF THE INVENTION

The background of the invention will be set forth in two parts.

Field of the invention

The present invention relates generally to the field of means for improving combustion of fuel in an internal combustion engine downstream of its carburetor butterfly valve during deceleration and more particularly to means for admitting air to the intake manifold immediately downstream of the butterfly valve during deceleration.

DESCRIPTION OF THE PRIOR ART

It is well known that exhaust emission from internal combustion engines contribute to air pollution. This pollution is due, in part, to excessive amounts of hydrocarbon and carbon monoxide in the exhaust emission.

The amout of these two products in exhaust emission appears to increase greatly during deceleration of an internal combustion engine.

SUMMARY OF THE INVENTION

In view of the foregoing, it is a primary object of the present invention to provide means for improving combustion in an internal combustion engine during deceleration.

It is another object of the present invention to provide means for admitting air to the intake manifold of an internal combustion engine immediately downstream of its butterfly valve for a predetermined period of time during deceleration.

It is a further object of the preesnt invention to provide new and useful valve means for controlling the flow of air to an intake manifold immediately downstream of the butterfly valve in an internal combustion engine.

According to the present invention, an internal combustion engine having an intake manifold and a carburetor in fluid communication with the intake manifold is provided with means for improving the combustion of fuel downstream of the carburetor butterfly valve when the engine is decelerated. This means includes inlet means for admitting air to the intake manifold immediately downstream of the butterfly valve in the path of flow of fuel from the fuel-admitting means in the cahburetor. Valve means is connected to the inlet means for controlling flow of air therethrough and valve actuating means is connected to the valve means for automatically opening the valve means when the engine is decelerated by suddenly closing the butterfly valve so that unburned fuel downstream of the butterfly valve will be enriched with air during deceleration. The valve actuating means includes means for automatically closing the valve means after it has been opened a predetermined period of time.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIGURE 1 is a partial perspective view, with parts broken away to show internal construction, of an internal combustion engine provided with a device of the present invention;

FIGURE 2 is an enlarged, partial perspective view showing a portion of the carburetor and intake manifold of the engine of FIGURE 1 in combination with the device of the present invention;

FIGURE 3 is a schematic wiring diagram of an electrical circuit forming a part of the device of FIGURE 1;

FIGURE 4 is an enlarged, partial perspective view similar to FIGURE 2 showing a modified form of the device of the present invention;

FIGURE 5 is an enlarged, cross-sectional view taken along line 5—5 of FIGURE 4;

FIGURE 6 is an enlarged, cross-sectional view taken along line 6—6 of FIGURE 4; and FIGURE 7 is a wiring diagram of the device shown in FIGURE 4.

DESCRIPTION OF THE PREFERRED EMBODIMENT

Referring again to the drawings and more particularly to FIGURES 1–3, a device for admitting air to a carburetor downstream of its butterfly valve, generally designated 10, is shown in combination with an internal combustion engine 12.

The internal combustion engine 12 includes an intake manifold 14 having an upstanding, cylindrical member 16 to which a carburetor 18 is attached. The carburetor 18 includes a body 20 in which a butterfly valve 22 is swingably mounted on a rod 24 having a first end 26 rotatably seated in body 20 and a second end 28 extending exteriorly of body 20. The butterfly valve 22 has an upstream side 30 and a downstream side 32 and is mounted in the path of flow of fuel from a suitable fuel-supply means including carburetor 18 and an air cleaner 34.

The rod 24 may be connected to an accelerator pedal (not shown) in well known manner for rotation thereby for swinging butterfly valve 22 to an open position when the accelerator pedal is depressed and for automatically returning the butterfly valve 22 to the closed position shown in FIGURE 2 when the accelerator pedal is released. Sudden closing of the butterfly valve 22 when internal combustion engine 12 is operated at a predetermined speed (usually about 30 m.p.h. and higher) causes unburned gases on the downstream side of butterfly valve 22 to be discharged from engine 12 through its exhaust manifold 36 contributing significantly to air pollution. The device 10 reduces these unburned gases by admitting air to the downstream side of carburetor 18 for a few seconds after butterfly valve 22 is closed.

The device 10 includes inlet means 38 for admitting air to the intake manifold 14 immediately downstream of the butterfly valve 22 in the path of flow of fuel from carburetor 18. The inlet means 38 includes an aperture 40 provided in the cylindrical portion 16 of intake manifold 14 immediately downstream of butterfly valve 22. The inlet means 38 also includes an air inlet pipe 42 having a first end 44 positioned in aperture 40 and a second end 46 open to atmosphere through an opening 48. The effective size of opening 48 may be controlled by a set screw 50.

The device 10 also includes valve means 52 which is connected to the inlet means 38 for controlling flow of air thereto. The set screw 50 includes a frusto-conical end portion 51 controlling the size of opening 48.

The valve means 52 may comprise a solenoid-type valve having an armature 54 reciprocally mounted in a coil 56. The armature 54 includes a conical end 58 which is normally seated in pipe 42 by a compression spring 60 having one end 62 bearing against end 64 of armature 54 and another end 66 bearing against a rear wall 68 forming a part of a housing 70 for coil 56.

The coil 56 is connected in an electrical circuit, to be hereinafter described, by a first electrical lead 72 and a second electrical lead 74 and draws armature 54 to the left, as viewed in FIGURE 4, to unseat end 58 when energized.

The coil 56 forms part of an electrical circuit indicated generally at 76 in FIGURE 5. The circuit 76 includes a battery 78 which may comprise the conventional battery for the internal combustion engine 12. The circuit 76 also includes a first conduit 80 connecting battery 78 to a time-delay relay 82 and a second conduit 84 connecting battery 78 to a switch 86 which, in turn, is connected to the time-delay relay 82 by a conduit 88.

The time-delay relay 82 is connected to the valve means 52 by the leads 72, 74 and includes a heater 90 and a pair of contacts 92, 94 for automatically interrupting the flow of current to valve means 52 a few seconds (usually about 3–10 seconds) after switch 86 has been closed to energize coil 56.

The switch 86 includes a toggle 96 extending into the path of travel of a lobe 98 provided on a cam 100 affixed to end 28 of rod 24 for rotation thereby. The cam 100 is shaped so as to automatically bring lobe 98 into engagement with toggle 96 for closing switch 86 when butterfly valve 22 is swung to the closed position shown in FIGURE 2 after butterfly valve 22 has first been opened sufficiently to accelerate engine 12 up to about 30 m.p.h.

The size of opening 48 and the length of time that valve means 52 remains open during deceleration for a particular internal combustion engine may be determined by experiment. The HC and CO content of exhaust emission from engine 12 may be measured in conventional manner during deceleration from 30 m.p.h. repeatedly while adjusting screw 50 and time-delay relay 82.

It has been found that a ⅛ inch opening 48 and a 3-second setting on time-delay relay 82 cuts the HC from 500–700 p.p.m. to about 201 p.p.m. and the CO from approximately 3.5–4.5 to about 1.88 percent on a 1,600 cc. engine (four-cylinder MGB) decelerating from 30 m.p.h. to 0 m.p.h.

The switch 86 is normally biased to an open position and is closed by the lobe 98 contacting toggle 96 when the butterfly valve 22 is swung to the closed position shown in FIGURE 2. The lobe 98 will hold the toggle 96 in a closed position until the butterfly valve is opened sufficiently for 30 m.p.h. driving. At this point, cam 100 has been rotated sufficiently by shaft 24 to elevate lobe 98 above toggle 96.

The device 10 described in connection with FIGURES 1–5 is satisfactory for the smaller foreign cars. A larger car, on the other hand, usually requires a modified form of the device 10, as indicated at 10a in FIGURES 6 and 7.

The modified device 10a is shown herein for purposes of illustration, but not of limitation, as being connected to the carburetor 18 previously described as having a butterfly valve 22, a butterfly shaft 24, a cam 100 and a first switch 86. The cam 100 closes the first switch 86 from 30–0 m.p.h., as previously described. In addition, the device 10a includes a second cam 102 having a first lobe 104 and a second lobe 106. The device 10a also includes a pair of valve means 52, 52a which are identical to the valve means 52 previously described.

The cams 100 and 102 are arranged in such a manner that valve 52 will open to admit air to intake manifold 14 through the aperture 40 in cylindrical member 16 when an internal combustion engine, like the engine 12 in FIGURE 1, decelerates after attaining at least 30 m.p.h. and the cam 102 opens valve 52a admitting more air to intake manifold 14 when the internal combustion engine decelerates after having first reached 50 m.p.h. Thus, both valves 52 and 52a open when internal combustion engine 12 is decelerated after having first attained 50 m.p.h. It is not desirable to have both valves 52 and 52a open after having only attained 30 m.p.h. Therefore, valve 52a is preconditioned at 50 m.p.h. by the cam lobe 106 actuating a switch 108.

Cam lobe 104, on the other hand, actuates a second switch 86a when the lobe 98 actuates the first switch 86. However, the second switch 86a will not open its associated valve 52a unless the lobe 106 has first actuated switch 108 at 50 m.p.h. or better.

The device 10a also includes a modified inlet means 42a having a first end 46a which carries valve 52a and a second end 46b which carries valve 52. The ends 46a and 46b each have an opening, as shown at 48a for the end 46a, which are controlled by set screws 50a and 50b which operate in identical manner to the screw 50 previously described.

The valve means 52, 52a and the switches 86, 86a and 108 are included in an electrical circuit 76a which includes a pair of time-delay relays 82, 82a having heaters 90 and 90a and contacts 92, 92a, 94 and 94a. The circuit 76a also includes the battery 78 previously described and adds to the circuit 76 the second switch 86a, a second time-delay relay 82a and an arming device 110 constituting a third time-delay relay including a double-pole, single-throw switch 112 and a coil or heater 114 which prevents the second switch 86a and its associated valve means 52a from coming into play unless the internal combustion engine 12 has first attained 50 m.p.h. to close switch 108.

When switch 108 is closed, heater 114 heats closing switch 112 so that a circuit will be completed to the valve means 52a when the second switch 86a is closed. Conversely, should the second switch 86a be closed without switch 108 first having been closed, switch 112 will remain open so that a circuit will not be completed to the valve means 52a.

While the particular means for improving the combustion of fuel downstream of a butterfly valve in an internal combustion engine herein shown and described in detail are fully capable of attaining the objects and providing the advantages hereinbefore stated, it is to be understood that they are merely illustrative of the presently preferred embodiments of the invention and that no limitations are intended to the details of construction herein shown other than as defined in the appended claims, forming a part of this specification.

What is claimed is:

1. In combination with an internal combustion engine having an intake manifold and a carburetor in fluid communication with said manifold, said carburetor including a butterfly valve and means for admitting fuel to said carburetor upstream of said butterfly valve, means for improving the combustion of fuel downstream of said butterfly valve when said engine is decelerated, comprising:

inlet means for admitting air to said intake manifold immediately downstream of said butterfly valve in the path of flow of fuel from said fuel admitting means;

valve means connected to said inlet means for controlling flow of air thereto; and valve actuating means connected to said valve means for automatically opening said valve means when said engine is decelerated by closing said butterfly valve, whereby unburned fuel will be enriched with air during said deceleration, said valve actuating means including means for automatically closing said valve means after it has been opened a predetermined period of time, said valve actuating means including a cam mounted for rotation with said butterfly valve and a normally-open switch adapted to be closed by said cam when said engine is decelerated to a speed below 30 m.p.h.

2. A combination as stated in claim 1 wherein said valve means includes a first valve means which is opened by said actuating means when said engine is decelerated after having attained a speed of 30 m.p.h. and a second valve means which is opened by said actuating means only after said engine has first attained a speed of 50 m.p.h.

3. A combination as stated in claim 2 including arming means for preconditioning said second valve means to operate only after said engine has attained a speed of 50 m.p.h.

4. A combination as stated in claim 2 wherein said actuating means includes first and second cam means and first and second switch means, respectively, said first cam means closing said first switch means when said engine is decelerated below 30 m.p.h. and said second cam means closing said second switch means when said engine is decelerated below 30 m.p.h. after first having attained a speed of 50 m.p.h.

References Cited

UNITED STATES PATENTS

| | | |
|---|---|---|
| 1,887,515 | 11/1932 | Pulkinghorn. |
| 1,961,062 | 5/1934 | Mallory. |
| 1,977,518 | 10/1934 | Mallory. |
| 2,035,237 | 3/1936 | Kushinsky. |
| 2,107,874 | 2/1938 | Parvin. |
| 2,386,340 | 10/1945 | Olson. |
| 2,443,562 | 6/1948 | Hieger. |

MEYER PERLIN, *Primary Examiner.*